3,341,219
TRASH CAN RACK AND CART
Thomas O. Marini, 1500 Prospect Blvd., Haddon Heights, N.J. 08035, and Louis G. Marini, 316 Springhouse Lane, Moorestown, N.J. 08057
Filed Mar. 7, 1966, Ser. No. 532,191
3 Claims. (Cl. 280—47.19)

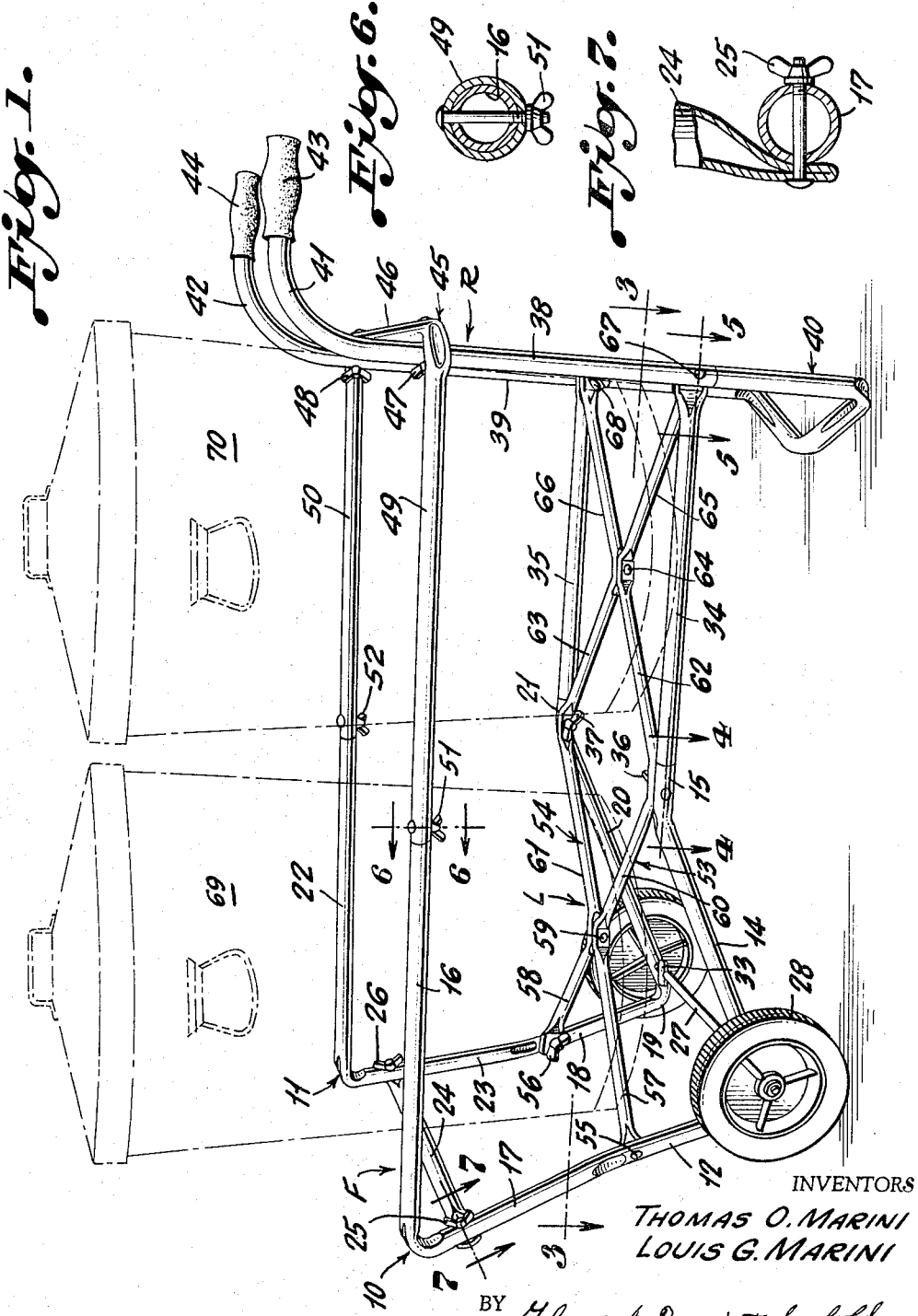

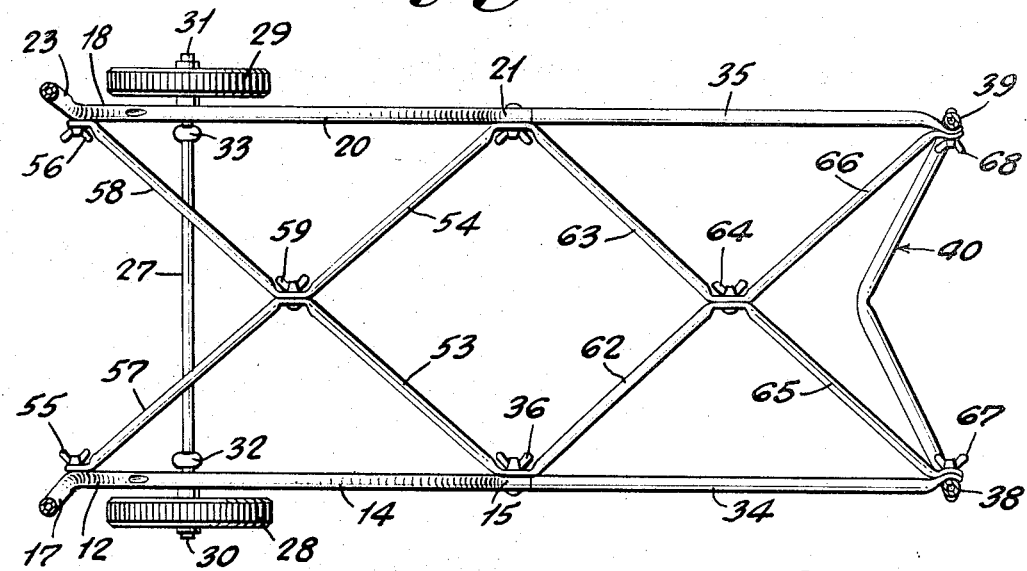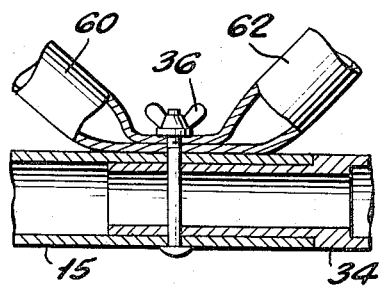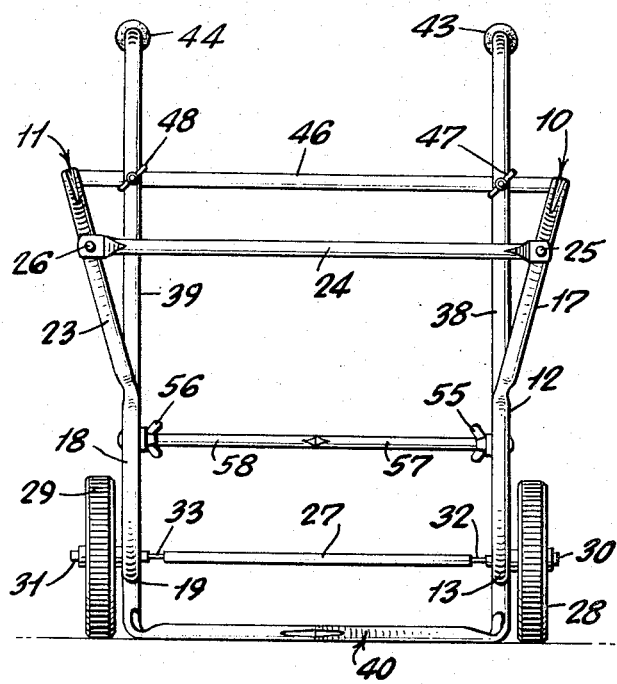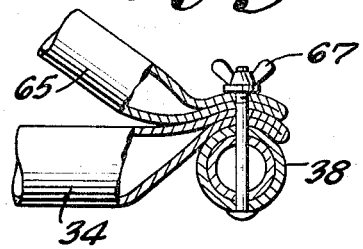
INVENTORS
THOMAS O. MARINI
LOUIS G. MARINI
BY Glascock, Downing & Seebold
ATTORNEYS United States Patent Office 3,341,219
Patented Sept. 12, 1967

This invention relates to storage and transportation and more particularly to a combined trash can rack and cart made up of pre-formed tubular structural elements which may be conveniently assembled and disassembled and in which the rack and cart may be conveniently packed and shipped in a knocked down condition.

The trash can rack and cart of this invention is particularly designed for domestic use and may serve to support trash or garbage containers in an elevated position out of contact with the ground thereby minimizing rusting of the containers and contributing to an increased usable life and when desired, used to conveniently transport the containers from the normal place of storage to a location easily accessible to the trash collectors or to any other location. While the cart of this invention has been primarily designed for supporting and transporting trash or garbage containers, obviously the same may be utilized for other purposes.

Numerous carts of this general type have heretofore been proposed and utilized, but the combined rack and cart of this invention is particularly well adapted for the use intended and may also be dis-assembled for ease of storage and re-assembled when required without the use of special tools or any particular mechanical skill.

It is accordingly an object of the invention to provide a combined trash can rack and cart made up of pre-formed tubular structural elements which is light in weight and which may be conveniently assembled and dis-assembled without the use of special tools.

A further object of the invention is the provision of a combined trash can rack and cart, particularly designed to store and transport generally cylindrical containers, such as trash and garbage containers but which may be also utilized for supporting and transporting other types of containers.

A still further object of the invention is the provision of a combined trash can rack and cart made up of pre-formed tubular structural elements and in which such elements may be conveniently packed and shipped in a knocked down condition and thereafter quickly and conveniently assembled by the user without the use of special tools or any particular mechanical skill.

Another object of the invention is the provision of a combined trash can rack and cart including a pair of ground engaging wheels mounted on an axle and in which portions of the cart extend outwardly of the outer end of the axle in order to prevent engagement of the outer ends of the axle with the sides of a gate or other objects through which the cart may be moved.

Further objects and advantages of the invention will be apparent from the following description taken in conjunction with the accompanying drawings wherein:

FIG. 1 is a view in perspective showing the combined trash can rack and cart of this invention, together with a pair of containers disposed therein and indicated in dotted outline;

FIG. 2 a front elevational view of the cart shown in FIG. 1;

FIG. 3 a sectional view taken substantially on the line 3—3 of FIG. 1;

FIG. 4 a fragmentary sectional view taken substantially on the line 4—4 of FIG. 1 and showing a detail of the invention;

FIG. 5 a fragmentary sectional view taken substantially on the line 5—5 of FIG. 1 and showing a further detail of the invention;

FIG. 6 a sectional view taken substantially on the line 6—6 of FIG. 1; and

FIG. 7 is a fragmentary sectional view taken substantially on the line 7—7 of FIG. 1.

With continued reference to the drawings there is shown a combined trash can rack and cart constructed in accordance with this invention and which may conveniently be made up of tubular structural elements in order to provide sufficient strength and also at the same time to provide a lightweight rack and vehicle which is economical to construct and also convenient to assemble and dis-assemble. The rack and cart as shown in the drawing, comprises a front section F, a rear section R and a load supporting and bracing section L.

The front section F comprises a pair of spaced side frames 10 and 11 and the frame 10 comprises an upwardly and forwardly disposed front member 12 terminating at the lower end in a front curved portion 13 merging into a rearwardly and upwardly inclined lower front side member 14 and terminating in a relatively short rearwardly extending horizontal portion 15. The front member 12 terminates at the upper end in a horizontal rearwardly extending upper side member 16. It is also to be noted that as clearly shown in FIG. 2, the upper portion 17 of the front member 12 extends upwardly and outwardly in such a manner that the upper side member 16 is disposed outwardly of the lower front side member 14.

In a similar manner, the frame 11 comprises an upwardly and forwardly disposed front member 18 terminating at the lower end in a front curved portion 19 which merges into a rearwardly and upwardly inclined lower front side member 20 terminating in a relatively short rearwardly extending horizontal portion 21. The front member 18 terminates at the upper end in a horizontal rearwardly extending upper side member 22 and as clearly shown in FIG. 2, the upper portion 23 of the front member 18 extends upwardly and outwardly in such a manner that the upper side member 22 is disposed outwardly of the lower front side member 20.

A removable front cross bar 24 extends between the upper portions 17 and 23 of the front members 12 and 18 and the crossbar 24 may be removably secured in place by suitable screw threaded fastening means, such as bolts and wing nuts 25 and 26.

The front curved portions 13 and 19 are provided with aligned apertures therein and an axle 27 is removably received in such apertures with the ends projecting outwardly of the lower front side members 14 and 20. Ground engaging wheels 28 and 29 are rotatably received on the projecting ends of the axle 27 outwardly of the lower side frame members 14 and 20 and the wheels 28 and 29 are secured in position on the axle 27 by end caps 30 and 31 frictionally retained on the ends of the axle 27. Inwardly of the lower side members 14 and 20, the axle 27 is provided with flat enlarged portions 32 and 33 which serve to prevent inward movement of the front curved portions 13 and 19 of the front frames 10 and 11.

The rear section R comprises a pair of spaced horizontal rearwardly extending lower side bars 34 and 35 removably secured to the short horizontal portions 15 and 21 by suitable screw threaded fastening means, such as bolts and wing nuts 36 and 37. A pair of spaced substantially vertical handle bars 38 and 39 are removably secured to the rear ends of the lower side bars 34 and 35 and removably secured to the lower ends of the handle bars 38 and 39 is an generally U-shaped ground engaging foot 40. The upper ends of the handle bars 38 and 39 curve rearwardly as at 41 and 42 and suitable hand grips 43 and 44 may be provided thereon. An upper generally U-shaped frame member 45 provides a rear cross bar 46 removably secured to the handle bars 38 and 39 by suitable screw threaded fastening means, such as bolts and wing nuts 47 and 48 and spaced horizontal forwardly extending upper side bars 49 and 50 removably secured to the rear ends of the upper side members 16 and 22 by suitable screw threaded fastening means, such as bolts and wing nuts 51 and 52.

The load supporting and bracing section L comprises a pair of identical tubular members 53 and 54, the forward ends thereof being detachably connected to the front members 12 and 18 of the front side frames 10 and 11 by suitable screw threaded fastening means, such as bolts and wing nuts 55 and 56. Portions 57 and 58 of the members 53 and 54 extend rearwardly and inwardly and are secured together by suitable screw threaded fastening means, such as a bolt and wing nut 59 and the portions 60 and 61 of the members 53 and 54 extend outwardly and rearwardly and are secured to the short horizontal portions 15 and 21 by the bolts and wing nuts 36 and 37. Portions 62 and 63 of the members 53 and 54 extend rearwardly and inwardly and are secured together with screw threaded fastening means, such as a bolt and wing nut 64 and portions 65 and 66 of the members 53 and 54 extend rearwardly and outwardly and are secured to handle bars 38 and 39 by suitable screw threaded fastening means, such as bolts and wing nuts 67 and 68. Thus, as clearly shown in FIGS. 1 and 3 of the drawings, the members 53 and 54 comprising the load supporting and bracing section L provide a double X structure horizontally disposed between the front frame members 12 and 18 and the handle bars 38 and 39 and so positioned as to support trash cans or the like 69 and 70 shown in dotted outline in FIG. 1, although, of course, other containers or objects could be conveniently supported by the load supporting and bracing section L. The containers 69 and 70 are also prevented from over turning by upper side members 16 and 22, as well as 49 and 50 and also by the front cross bar 24 and rear cross bar 46.

The upper side bars 16 and 22 and the rear upper side bars 49 and 50 may be so formed as to provide a telescoping joint therebetween for convenient assembly and the same type of joint may be provided between the short horizontal sections 15 and 21 and the lower side bars 34 and 35. In a similar manner, telescoping joints may be provided between the upper ends of the U-shaped foot section 40 and the lower ends of the handle bars 38 and 39.

It will thus be seen that by the above described invention, there has been provided a conveniently, lightweight and economical combined trash can rack and cart which may be conveniently utilized to support trash cans during the filling thereof and thereafter utilized to transport the cans to a location convenient to the trash collectors.

It will be obvious to those skilled in the art that various exchanges may be made in the invention without departing from the spirit and scope thereof and therefore the invention is not limited by that which is shown in the drawings and described in the specification, but only as indicated in the appended claims.

What is claimed is:

1. A trash can rack and cart formed of tubular structural elements which may be conveniently assembled and dis-assembled and comprising a front section, a rear section, and a load supporting and bracing section, said front section comprising a pair of spaced side frames, each frame comprising an upwardly and forwardly disposed front member terminating at the lower end in a front curved portion merging into a rearwardly and upwardly inclined lower front side member and terminating in a relatively short horizontal portion, said front member terminating at the upper end in a horizontal rearwardly extending upper side member, a removable front cross bar extending between said front members adjacent the upper ends, said front curved portions having aligned apertures therein, an axle removably received in said apertures and projecting outwardly of said side frames, and ground engaging wheels mounted on said axle outwardly of said side frames, rear section comprising a pair of spaced, horizontal, rearwardly extending lower side bars removably secured to said short horizontal portions, a pair of spaced substantially vertical handle bars removably secured to the rear ends of said lower side bars, a generally U-shaped ground engaging foot removably secured to the lower ends of said handle bars, the upper ends of said handle bars being curved rearwardly to provide hand-engaging portions, and an upper generally U-shaped frame member providing a rear cross bar removably secured to said handle bars and spaced, horizontal, forwardly extending upper side bars removably secured to the rear ends of said upper side members, said load supporting and bracing section comprising a pair of identical tubular members detachably connected to said front members, to said short horizontal portions and to said handle bars and said tubular members extending inwardly and being detachably secured together intermediate said front members and said short horizontal portions and said handle bars to provide a double X-shaped structure.

2. A trash can rack and cart as defined in claim 1 in which all detachable connections include bolts and wing nuts.

3. A trash can rack and cart as defined in claim 1 in which said axle is provided with spaced enlarged portions engaging the inner sides of said side frames to retain the same in spaced relation, and friction caps removably received on the outer ends of said axle to removably retain said wheels thereon.

References Cited

UNITED STATES PATENTS 2,855,210  10/1958  Joyce _____ 280—47.19
3,111,333  11/1963  Marini et al. _____ 280—47.19

BENJAMIN HERSH, *Primary Examiner.*

J. A. PEKAR, *Assistant Examiner.*